(12) United States Patent
Woo

(10) Patent No.: US 9,074,339 B2
(45) Date of Patent: Jul. 7, 2015

(54) METHOD FOR INSTALLING AN UNDERWATER SUPPORT COLUMN

(76) Inventor: Do Young Woo, Gangwon-do (KR)

( * ) Notice: Subject to any disclaimer, the term of this patent is extended or adjusted under 35 U.S.C. 154(b) by 0 days.

(21) Appl. No.: 14/123,750

(22) PCT Filed: Mar. 21, 2012

(86) PCT No.: PCT/KR2012/002020
§ 371 (c)(1),
(2), (4) Date: Dec. 3, 2013

(87) PCT Pub. No.: WO2012/169723
PCT Pub. Date: Dec. 13, 2012

(65) Prior Publication Data
US 2014/0126964 A1    May 8, 2014

(30) Foreign Application Priority Data
Jun. 7, 2011 (KR) .................... 10-2011-0054531

(51) Int. Cl.
*E02D 27/52* (2006.01)
*E02D 27/42* (2006.01)
*E02B 17/02* (2006.01)
*E02D 7/06* (2006.01)
*E02B 17/00* (2006.01)

(52) U.S. Cl.
CPC ............ *E02D 27/525* (2013.01); *E02D 27/425* (2013.01); *E02B 17/02* (2013.01); *E02D 27/52* (2013.01); *E02B 17/00* (2013.01); *E02D 7/06* (2013.01); *E02B 2017/0065* (2013.01)

(58) Field of Classification Search
CPC ......................... E02D 27/525; E02D 27/425
USPC ........................................... 405/226
See application file for complete search history.

(56) References Cited

U.S. PATENT DOCUMENTS

| | | | | |
|---|---|---|---|---|
| 3,255,591 | A * | 6/1966 | Thornley | 405/225 |
| 4,222,684 | A * | 9/1980 | Rosenstock | 405/232 |
| 4,480,944 | A * | 11/1984 | Phares | 405/223 |
| 4,558,744 | A * | 12/1985 | Gibb | 166/335 |
| 2007/0177948 | A1 * | 8/2007 | Fedrick | 405/228 |

FOREIGN PATENT DOCUMENTS

| | | |
|---|---|---|
| CN | 2009582009 | 10/2007 |
| CN | 201649118 | 11/2010 |
| CN | 201746849 | 2/2011 |

(Continued)

OTHER PUBLICATIONS

International Search Report for International Application No. PCT/KR2012/002020; Oct. 17, 2012; 18 pages.

*Primary Examiner* — John Kreck
(74) *Attorney, Agent, or Firm* — Stetina Brunda Garred & Brucker

(57) ABSTRACT

Disclosed is a method for installing a support column under the water. The method includes: (step 1) installing a plurality of steel pipes to stand up at regular distance on the floor of a place with water; (step 2) inserting a drilling rod into each of the steel pipes, to excavate a bedrock with a bit attached to an end portion of the drilling rod and fixing the drilling rod on the bedrock; and (step 3) placing and curing an accelerating agent containing concrete or mortar inside each of the steel pipes. According to the disclosed method, the solar generating apparatus mounted on a floating plate can be more securely supported by firmly installing the support column.

7 Claims, 8 Drawing Sheets

(56) References Cited

FOREIGN PATENT DOCUMENTS

| JP | 6146305 | 5/1994 |
| JP | 06146305 | 5/1994 |
| JP | 2007-239420 | * 9/2007 |
| JP | 2007239420 | 9/2007 |
| KR | 1020050075929 | 7/2005 |
| KR | 1020100008458 | 1/2010 |

* cited by examiner

METHOD FOR INSTALLING AN UNDERWATER SUPPORT COLUMN

CROSS-REFERENCE TO RELATED APPLICATION

This application claims priority to and the benefit of PCT Application No. PCT/KR2012/002020 filed Mar. 21, 2012, which claims priority to Korean Patent Application No. 10-2011-0054531 filed on Jun. 7, 2011, the entire contents of which are incorporated herein by reference.

BACKGROUND OF THE INVENTION

1. Technical Field of the Invention

The present invention relates to a method for installing a support column under the water, for securely supporting a solar generating apparatus floatably installed on a surface of a river, a lake, sea or an artificial water tank placed on land.

2. Description of the Background Art

In general, a solar generating apparatus produces electricity using solar cells generating photovoltaic power by a photoelectric effect when sunlight is irradiated.

As shown in FIG. 1, a solar generating apparatus 100 installed on the water includes a floating plate 110 floating on the water, a solar generating apparatus (e.g., only a solar cell module 120, as illustrated in FIG. 1.) mounted on the floating plate 110, a support column 130 passing through the floating plate 110 and disposed to be perpendicular to the water surface, a first supporting unit 140 fixedly connected to a top end of the support column 130 and a second supporting unit 150 fixedly connected to a bottom end of the support column 130.

First, the floating plate 110 positioned on the water surface is formed of a buoyant material and has a through opening 111 formed at a predetermined position, preferably at a central portion thereof.

A solar generating apparatus, such as a solar cell module 120, a power converting apparatus or a storage battery, is installed on the floating plate 110. The construction and function of the solar generating apparatus are generally known so that and a detailed description thereon will be omitted.

In addition, the support column 130 passes through a through opening 111 formed in the floating plate 110. A terminating end (e.g., a bottom end) of the support column 130 corresponds to a bottom, and the other terminating end (e.g., a top end) of the support column 130 protrudes to a top portion of the floating plate 110.

The support column 130 is a steel rod having a predetermined diameter and has strength enough to support the floating plate 110.

In the meantime, the first supporting unit 140 connected to the top end of the support column 130 includes a plurality of cables. FIG. 2 illustrates the first supporting unit 140 constituted by two cables, that is, first and second cables 141 and 142.

The first cable 141 of the first supporting unit 140 has a first terminating end fixed to the top end of the support column 130 and a second terminating end fixed to a structure 141-1 installed on one side of opposite riverbanks. In addition, the second cable 142 of the first supporting unit 140 has the first terminating end fixed to the top end of the support column 130 and the second terminating end fixed to a structure 142-1 installed on the other side of opposite riverbanks.

Here, the first and second cables 141 and 142 of the first supporting unit 140 are preferably arranged in a line and most preferably arranged in a direction perpendicular to the flow of the river. In addition, the first and second cables 141 and 142 are preferably perpendicular to the support column 130.

The second terminating end of the first cable 141 is fixed to a winch 141-2 installed in the structure 141-1. Accordingly, tension of the first cable 141 may be adjusted according to actuation of the winch 142-1.

Meanwhile, a sensor 141-3 sensing tension of a cable may be installed in the first cable 141. The sensor 141-3 transmits a signal associated with the sensed tension of the first cable 141 to a controller (not shown). The controller actuates the winch 141-2 based on the signal to wind or unwind the first cable 141.

Here, the winch 142-2 having the terminating end of the second cable 142 fixed thereto may be installed in the structure 142-1, and a sensor 141-3 sensing tension of the second cable 142 may also be installed in the second cable 142.

In addition, the second supporting unit 150 connected to the bottom end of the support column 130 includes a plurality of cables. FIG. 2 illustrates the second supporting unit 150 constituted by four cables, that is, first, second, third and fourth cables 151, 152, 153 and 154. The first to fourth cables 151, 152, 153 and 154 of the second supporting unit 150 have the same configuration, and will now be described with regard to only the first cable 151 by way of example.

The first cable 151 of the second supporting unit 150 has a first terminating end fixed to the bottom end of the support column 130 and a second terminating end fixed to a bottom adjacent to one riverside. Here, various elements may be used to fix the second terminating end of the first cable 151 to the bottom adjacent to one riverside. For example, in a state in which an anchor 151-1 is fixed to the second terminating end of the first cable 151, the anchor 151-1 is fixed to the bottom, thereby fixing the second terminating end of the first cable 151 on the river floor. Alternatively, a concrete structure may be constructed on the bottom, and the second terminating end of the first cable 151 may then be fixed to the concrete structure.

Meanwhile, the number of cables constituting the second supporting unit 150 is not limited. However, in order to effectively support the floating plate 110, that is, in order to suppress the floating plate 150 from moving to a downstream of the river or to either riverside, four cables 151, 152, 153 and 154, which are spaced apart from each other at an angular interval of 90 degrees, are preferably arranged at an angle of 45 degrees with respect to a direction of the flow of the river.

Hereinafter, the operation of the solar generating apparatus 100 installed on the water will be described with reference to the accompanying drawings.

In the conventional solar generating apparatus 100, the floating plate 110 may move up and down along the support column 130 as the water level of a river, a lake, a sea or an artificial water tank varies. That is to say, the floating plate 110 freely moves up and down according to the variation of water level.

That is to say, positions of the solar generating apparatus 100, that is, positions of the floating plate 110 and the solar generating apparatus 100, are indicated by dotted lines of FIG. 2, which illustrates a state in which the floating plate 110 is lowered along the support column 130 according to the water level.

In the conventional solar generating apparatus 100, a terminating end (i.e., a bottom end) of the support column 130 corresponds to the bottom and is allowed to stand up. The support column 130 is constructed such that it is allowed to stand up by the first supporting unit 140 and the second supporting unit 150 installed at the top and bottom ends of the support column 130.

Therefore, in a case where the tension of a cable of one of the first supporting unit 140 and the second supporting unit 150 varies, the support column 130 in a standing state leans to one side, so that the floating plate 110 may be unstably supported. In addition, it is quite difficult to install the support column 130 under the water due to its mechanical complexity.

BRIEF SUMMARY OF THE INVENTION

The present invention is invented to solve the above-mentioned shortcomings, an object of the present invention is to provide a method for installing a support column under the water, which facilitates construction of a solar generating apparatus and which can more firmly support a floating plate.

According to an aspect of the invention, there is provided a method for installing a support column under the water, the method including the first step of installing a plurality of steel pipes to stand up at regular distance on the floor of a place with water, the second step of inserting a drilling rod into each of the steel pipes, to excavate a bedrock with a bit attached to an end portion of the drilling rod and fixing the drilling rod on the bedrock, and the third step of placing an accelerating agent containing concrete or mortar inside each of the steel pipes and curing it.

The method for installing a support column under the water according to the present invention may further include the fourth step of installing a supporting plate which is passed through and supported by each of the steel pipes and integrally fixing the steel pipes on the floor.

The method for installing a support column under the water according to the present invention may further include the fifth step of installing a support column accommodating the steel pipes together to stand up and to be installed the supporting plate.

The method for installing a support column under the water according to the present invention may further include the sixth step of placing an accelerating agent containing concrete or mortar into the support column and curing it.

The method for installing a support column under the water according to the present invention may further include the step 6' of fastening a lower portion of the support column to a top surface of the supporting plate.

The method for installing a support column under the water according to the present invention may further include the step 5-1 of allowing a post to stand up and to be installed on the supporting plate and fastening the post.

The method for installing a support column under the water according to the present invention may further include the step of 6-1 of mounting an anchor plate on the post and allowing the plurality of steel pipes to pass through a top portion of the anchor plate to then be fixed.

As described above, in the method for installing a support column under the water, a solar generating apparatus mounted on a floating plate can be more securely supported by firmly installing a support column.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, a method for installing a support column under the water according to one embodiment of the present invention will be described in detail with reference to the accompanying drawings.

Before describing the present invention, it should be understood that the terms and words used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation for the invention.

Therefore, embodiments described in the specification and the example illustrated in the accompanying drawings herein is just a mere example for the purpose of illustrations only, not intended to represent all the technical aspects of the embodiment, the scope of the invention, so it should be understood that various equivalents and modifications thereof could be made at the time of filing.

Figure 1:
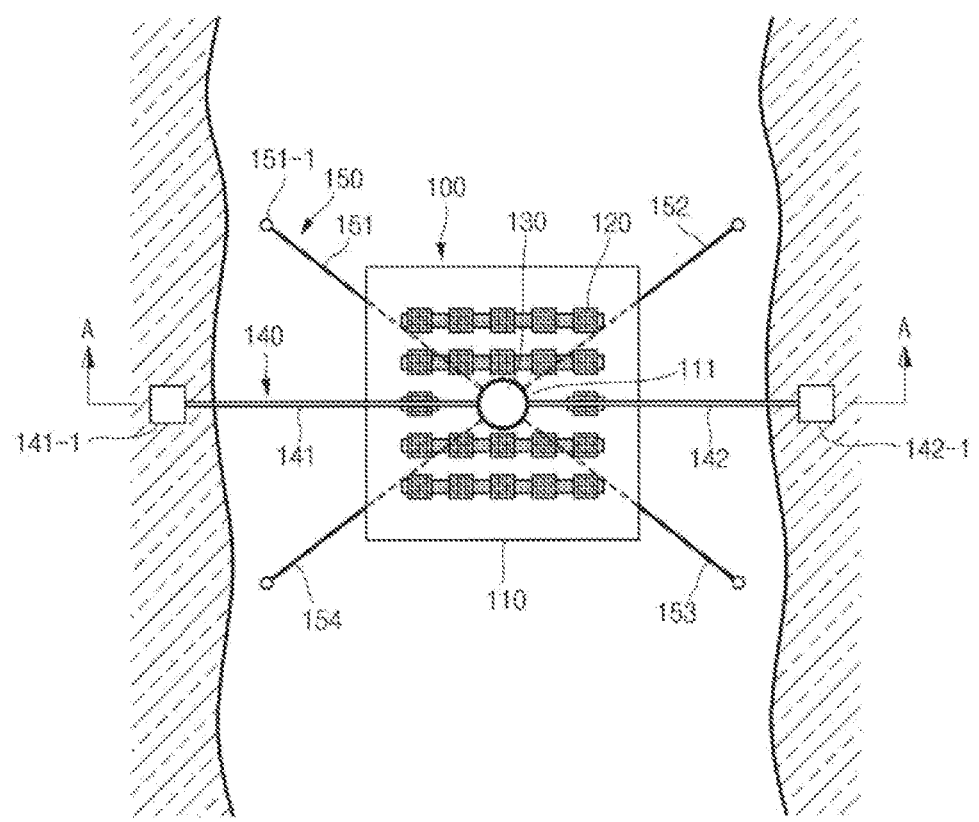
FIG. 1 is a plan view of a conventional solar generating apparatus installed on the water (river)
Figure 2:
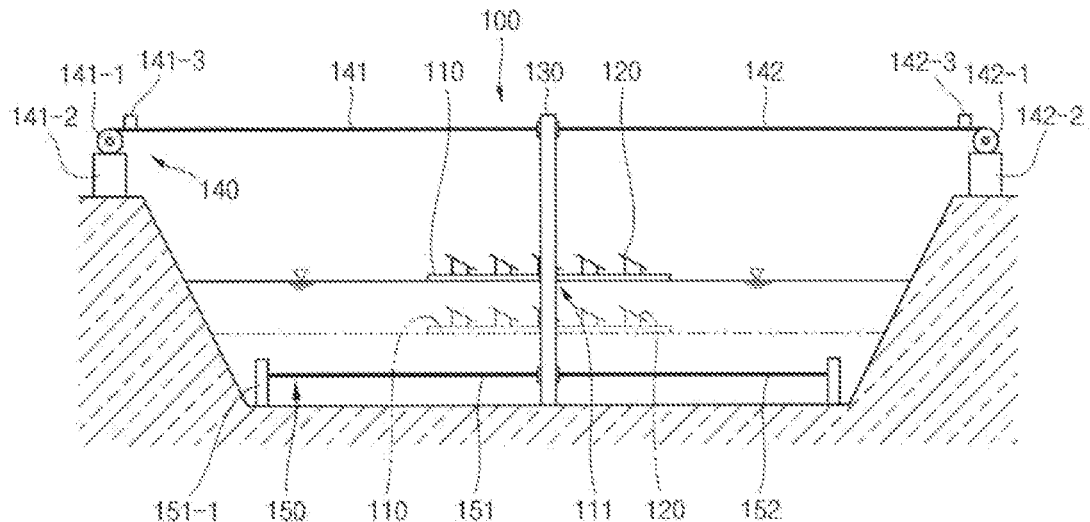
FIG. 2 is a cross-sectional view taken along the line A-A of FIG. 1.
Figure 3:
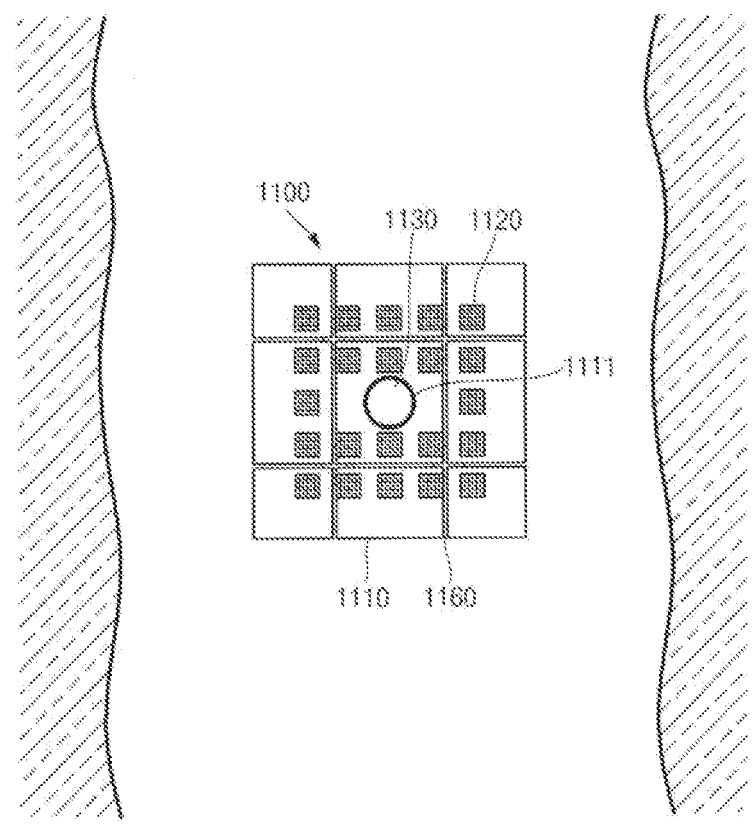
FIG. 3 is a plan view of a solar generating apparatus installed on the water according to an embodiment of the present invention.
Figure 4:
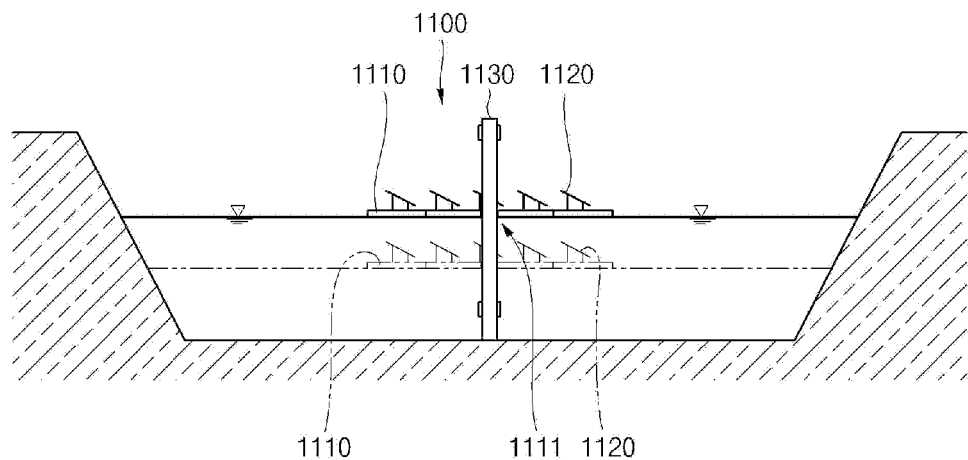
FIG. 4 is a cross-sectional view taken along the line A-A of FIG. 3.

As shown in FIGS. 3 and 4, the solar generation apparatus 1100 installed on the water according to an embodiment of the present invention includes floating plates 1110 floating on the water, a solar generating apparatus (e.g., only a solar cell module 120, as illustrated in FIGS. 3 and 4) mounted on each of the floating plates 1110, and a support column 1130 passing through each of the floating plates 1110 and disposed to be perpendicular to the water surface.

First, the floating plates 1110 are formed of a plurality of buoyant materials and have a through opening 1111 formed at a central portion of the centrally positioned one of the floating plates 1110. In addition, the centrally positioned floating plate 1110 is stably positioned when it is connected to other arranged radially floating plates 1110 and may have an appropriate thickness and shape so as to firmly support the support column 1130.

The floating plates 1110 according to the present invention are shaped of an rectangle of generally 2,000 to 3,000 pyeongs (Korean unit for area). Specifically, the floating plates 1110 consist of multiple rectangular units, each of which having an area of 200 to 300 pyeongs, connected to each other may be used. According to the present invention, a plate fastening unit 1160 may further be provided to connect the floating plates 1110 to each other.

Figure 5:
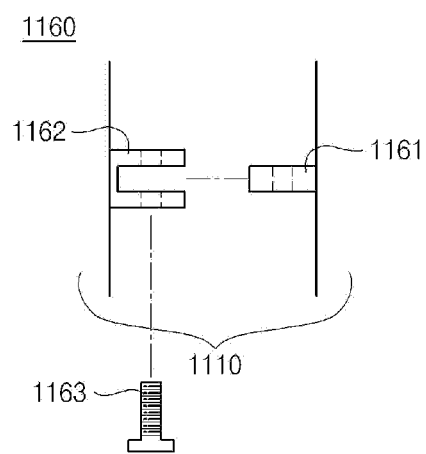
FIG. 5 is a partly enlarged view illustrating a process for coupling floating plates.
Figure 6:
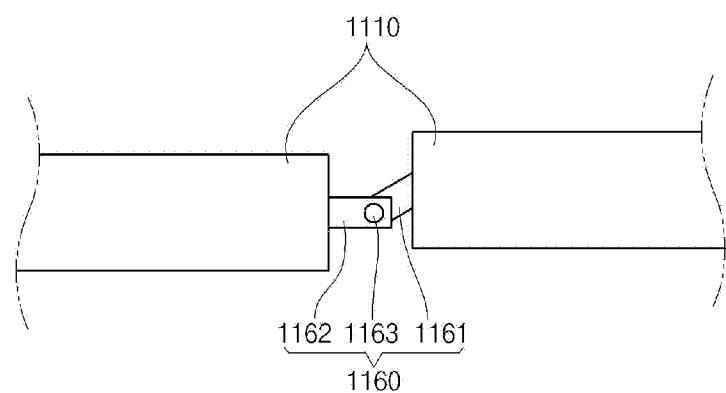
FIG. 6 illustrates a coupling state of the floating plates of FIG. 5 and an operation of the coupled floating plates.

That is to say, as shown in FIG. 5, the plate fastening unit 1160 includes an insertion part 1161 installed to be supported to one side (e.g., the right side of FIG. 4) of the floating plate 1110, a receiving part 1162 installed to be supported to the other side (e.g., the left side of FIG. 4) of the floating plate 1110 and meshed with the insertion part 1161, and a fastening part 1163 passing through the insertion part 1161 and a side surface of the receiving part 1162 and connecting the insertion part 1161 and the receiving part 1162 to be rotatable with respect to each other.

Here, the insertion part 1161 and the receiving part 1162 may be fixed on each of the floating plates 1110 to be rotatable up and down and left and right using a general connection member (not shown), which is generally known in the art and a detailed explanation thereof will be omitted.

The plate fastening unit 1160 includes at least two plates fastening units installed on connection surfaces (side surfaces) between the floating plates 1110 to be connected to adjacent floating plates 1110 more firmly.

Meanwhile, solar cell modules 1120 are arranged on top surfaces of the floating plates 1110. The configuration and functions of the solar generating apparatus 100 are the same as generally known in the art, and a detailed description thereof will be omitted.

In addition, the support column 1130 passes through the through opening 1111 formed in the floating plate 1110. A terminating end (e.g., a bottom end) of the support column 1130 corresponds to a bottom of the river, and the other terminating end (e.g., a top end) of the support column 1130 protrudes to a top portion of the floating plate 1110.

The support column 1130 may be formed of any material and may have any shape without limitation as long as the support column 1130 can support the floating plate 1110. For example, the support column 1130 may be a steel rod having a predetermined diameter.

Figure 7:
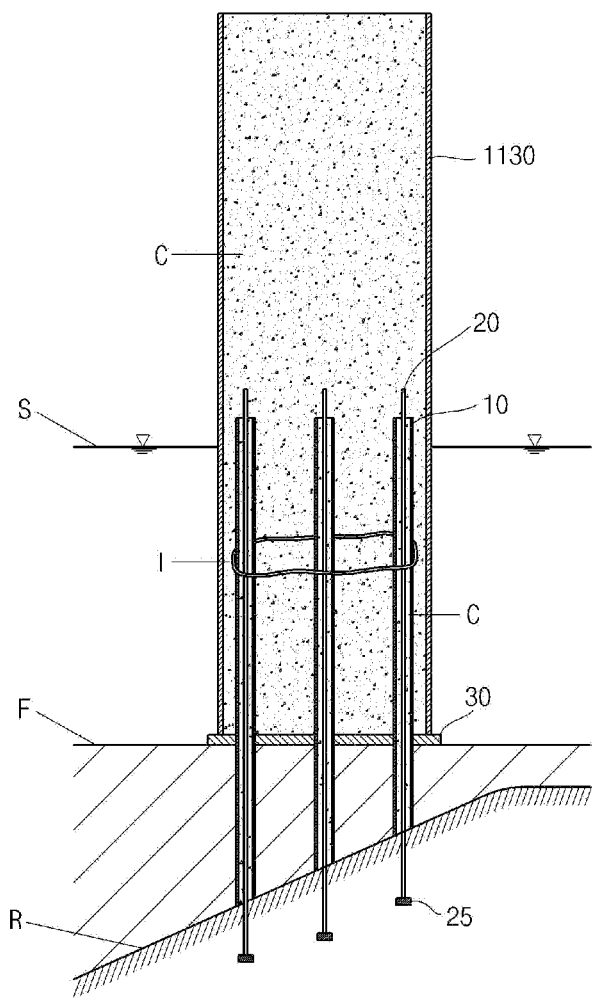
FIG. 7 illustrates a state in which a support column is installed under the water according to an embodiment of the present invention.
Figure 8:
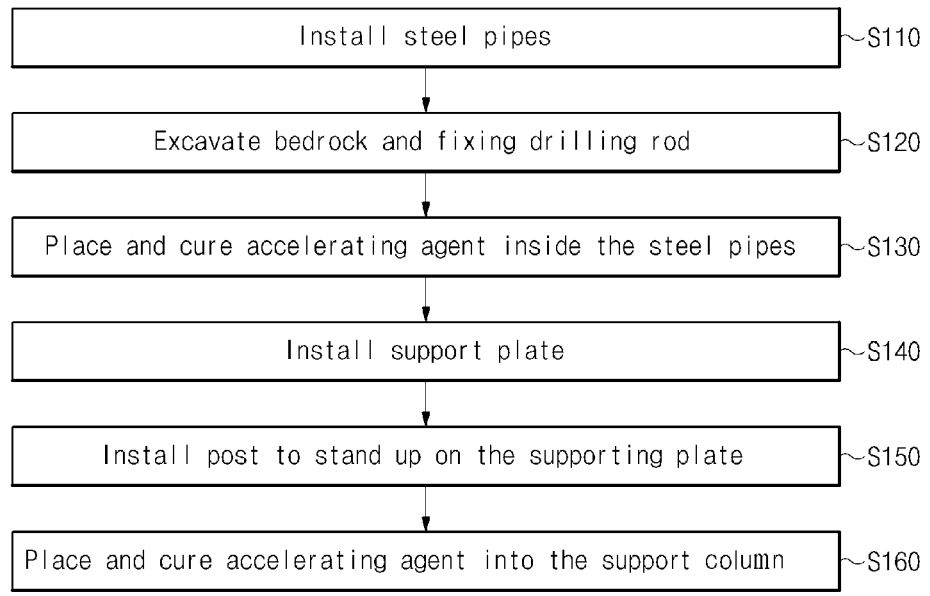
FIG. 8 is a flowchart illustrating a method of installing the support column is installed under the water according to one embodiment of the present invention.

In particular, as shown in FIGS. 7 and 8, the method for installing a support column under the water according to one embodiment of the present invention includes the first step of installing a plurality of steel pipes 10 to stand up at regular distance on the floor F of a place with water (S110), the second step of inserting a drilling rod 20 into each of the steel pipes 10, to excavate a bedrock R with a bit 25 attached to an end portion of the drilling rod 20 and fixing the drilling rod 20 on the bedrock F (S120), and the third step of placing and curing an accelerating agent C containing concrete or mortar inside each of the steel pipes 10 (S130).

The first step (S110) and the second step (S120) are performed using a drilling machine (not shown) used in developing underground water. The drilling machine may be transported to a drilling location through a barge (not shown).

The general drilling machine includes a drilling rod, a bit, a bit rotation unit, a hydraulic motor, a hydraulic controller, and so on, and is widely used in the related art, and a detailed description thereof will be omitted.

The first step (S110) and the second step (S120) may be simultaneously performed using the conventional drilling machine. That is to say, the steel pipes 10 are buried into the floor F, the drilling rod 20 is inserted into each of the steel pipes 10 and the bit 25 is exposed to a bottom portion of each of the steel pipes 10 to excavate the bedrock (R) and to fix the drilling rod 20 on the bedrock R.

In third step (S130), concrete or mortar containing an accelerating agent (C) is placed and cured inside each of the steel pipes 10 to allow the steel pipes 10 to stand up firmly on the floor.

Meanwhile, the method for installing a support column under the water according to an embodiment of the present invention may further include the third step of installing a supporting plate 30 which is passed through and supported by each of the steel pipes 10 and integrally fixing the steel pipes 10 on the floor (S140 and S240).

Therefore, the plurality of steel pipes 10 are mutually supported to more firmly stand up. In addition, in order to reinforce a supporting state of the plurality of steel pipes 10 on the supporting plate 30, a steel rod I may be wound around the circumferential surface of each of the steel pipes 10.

In addition, the method for installing a support column under the water according to an embodiment of the present invention may further include the fifth step of installing a support column 1130 accommodating the steel pipes 10 together to stand up and to be installed on the supporting plate 30 (S150) and the sixth step of placing and curing an accelerating agent (C) containing concrete or mortar into the support column 1130 (S160).

Figure 9:
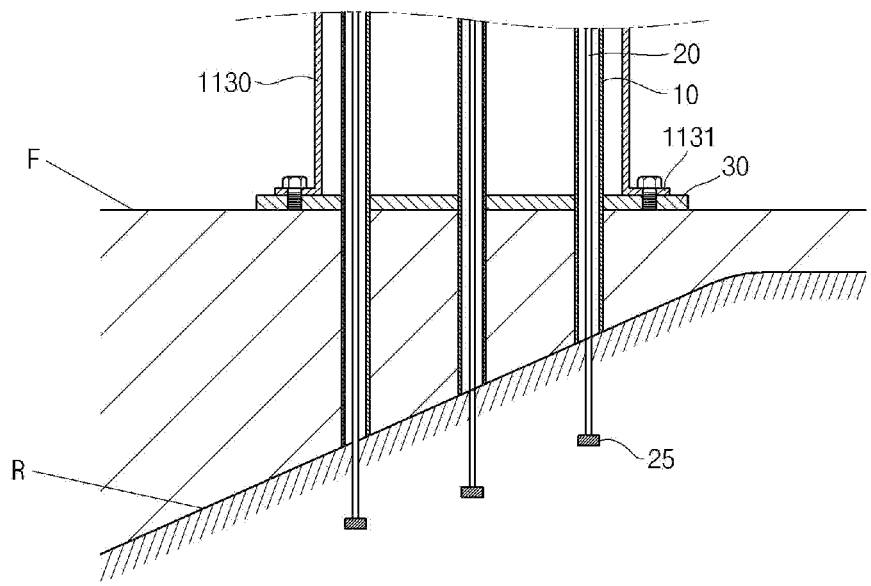
FIG. 9 illustrates a modified example of the installation state shown in FIG. 7.

As shown in FIG. 9, the step 6' of allowing a bottom portion of the support column 1130 (i.e., a flange 1131) to pass through the supporting plate 30 and to be fastened with the supporting plate 30 may be performed, instead of the sixth step (S160), using a fastening unit (not shown), thereby facilitating installation of the support column 1130.

As described above, in the method for installing a support column under the water according to an embodiment of the present invention, the solar generating apparatus mounted on the floating plate 1110 can be more securely supported by allowing the support column 1130 to pass through by the floating plate 1110.

Hereinafter, a method for installing a support column under the water according to another embodiment of the present invention will be described in detail with reference to the accompanying drawings.

Figure 10:
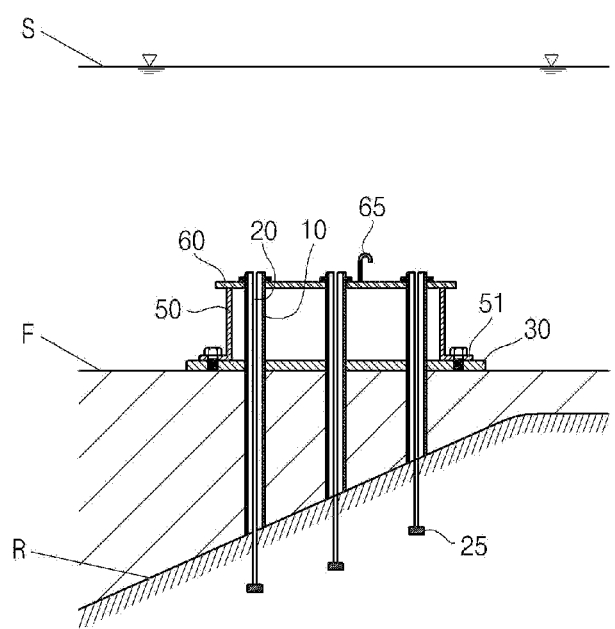
FIG. 10 illustrates a state in which a support column is installed under the water according to another embodiment of the present invention.
Figure 11:
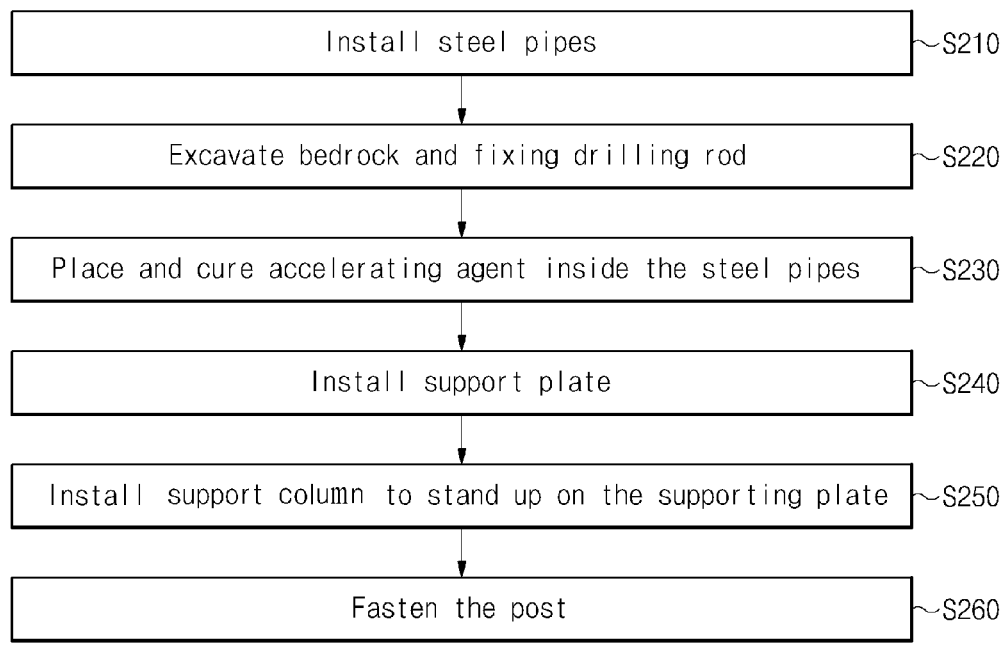
FIG. 11 is a flowchart illustrating a method of installing the support column is installed under the water according to another embodiment of the present invention.

As shown in FIGS. 10 and 11, the first step (S210) to the fourth step (S240) of this embodiment are the same as step 1 (S110) to step 4 (S140) of the previous embodiment, and detailed descriptions thereof will be omitted.

The current embodiment is different from the previous embodiment in that the step 5-1 (S250) and the step 6-1 (S260) are performed, instead of the fifth and sixth steps (S150 and 160) of the previous embodiment.

That is to say, the step 5-1 (S250), a post 50 is allowed to stand up and to be installed on the supporting plate 30. The post 50 may be installed by various methods, including vaulting, welding, placing by an accelerating agent.

For example, as shown in FIG. 10, a flange 51 is formed at a lower portion of the post 50, and the post 50 is fastened to a top portion of the supporting plate 30 using a widely known fastening unit.

Next, in the step 6-1 (S260), an anchor plate 60 is mounted on the post 50, and a plurality of steel pipes 10 are allowed to pass through the anchor plate 60 to then be fixed. Here, a connection loop 65 may further be installed on the top surface of the anchor plate 60 to be connected with various cables 151, 152, 153 and 154 of the conventional second supporting unit 150.

As described above, in the method for installing a support column under the water according to another embodiment of the present invention, the cables 151, 152, 153 and 154 of the conventional second supporting unit 150 are connected to the connection loop 65 of the anchor plate 60, thereby stably supporting a bottom end of the support column 1130 installed in a non-buried manner, and ultimately more securely supporting the solar generating apparatus mounted on the floating plate 1110.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A method for installing a support column under the water, the method comprising:
   installing a plurality of steel pipes to stand up at regular intervals on the floor of a place with water;
   inserting a drilling rod into each of the steel pipes, to excavate a bedrock with a bit attached to an end portion of the drilling rod and fixing the drilling rod on the bedrock; and
   placing and curing an accelerating agent containing concrete or mortar inside each of the steel pipes.

2. The method of claim 1, further comprising installing a supporting plate to allow the steel pipes to pass through the supporting plate, to be supported by the supporting plate and to be integrally fixed.

3. The method of claim 2, further comprising installing a support column accommodating the steel pipes together to stand up and to be installed on the supporting plate.

4. The method of claim 3, further comprising placing and curing an accelerating agent containing concrete or mortar into the support column.

5. The method of claim 3, further comprising fastening a lower portion of the support column to a top surface of the supporting plate.

6. The method of claim 2, further comprising of al standing up a post and fastening the post to the supporting plate.

7. The method of claim 6, further comprising of mounting an anchor plate on the post, allowing the plurality of steel pipes to pass through and then to be fixed to a top portion of the anchor plate.

* * * * *